US012570099B2

(12) United States Patent
Bel Calavia et al.

(10) Patent No.: US 12,570,099 B2
(45) Date of Patent: Mar. 10, 2026

(54) SUBSTRATE ALIGNMENT

(71) Applicant: Hewlett-Packard Development Company, L.P., Spring, TX (US)

(72) Inventors: Josep Maria Bel Calavia, Sant Cugat del Valles (ES); Ignasi Bonjoch Roma, Sant Cugat del Valles (ES); Andreu Vinets Alonso, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 406 days.

(21) Appl. No.: 18/006,095

(22) PCT Filed: Jul. 20, 2020

(86) PCT No.: PCT/US2020/042740
§ 371 (c)(1),
(2) Date: Jan. 19, 2023

(87) PCT Pub. No.: WO2022/019877
PCT Pub. Date: Jan. 27, 2022

(65) Prior Publication Data

US 2023/0278354 A1 Sep. 7, 2023

(51) Int. Cl.

| | |
|---|---|
| ***B41J 15/16*** | (2006.01) |
| ***B65H 23/18*** | (2006.01) |
| ***B65H 23/188*** | (2006.01) |
| ***B65H 23/192*** | (2006.01) |

(52) U.S. Cl.
CPC .......... *B41J 15/16* (2013.01); *B65H 23/1806* (2013.01); *B65H 23/1888* (2013.01); *B65H 23/192* (2013.01); *B65H 2403/942* (2013.01); *B65H 2404/147* (2013.01); *B65H 2553/51* (2013.01); *B65H 2601/272* (2013.01); *B65H 2801/09* (2013.01)

(58) Field of Classification Search
CPC .................... B41J 15/16; B41J 15/165; B65H 2301/41462
See application file for complete search history.

(56) References Cited

U.S. PATENT DOCUMENTS

| | | | | |
|---|---|---|---|---|
| 7,319,842 | B2 | 1/2008 | Koyanagi et al. | |
| 7,694,965 | B2 * | 4/2010 | Bruhn .................... | B65H 7/02 101/248 |
| 8,159,159 | B2 | 4/2012 | Fernandez et al. | |
| 8,864,272 | B2 | 10/2014 | Claramunt et al. | |
| 2010/0187745 | A1 * | 7/2010 | Herpell .................... | B41J 2/155 270/52.17 |

(Continued)

FOREIGN PATENT DOCUMENTS

| | | | |
|---|---|---|---|
| CN | 205238791 | U | 5/2016 |
| GB | 2458986 | A | 10/2009 |

*Primary Examiner* — Anna M Momper
*Assistant Examiner* — Nathaniel L Adams
(74) *Attorney, Agent, or Firm* — Jordan IP Law, LLC

(57) ABSTRACT

Example implementations provide a controller comprising circuitry to align a substrate; the controller comprising: circuitry to control varying the tension of an unspooled portion of the substrate between a spool bearing the substrate and a pinch roller; said circuitry comprising circuitry to control varying the pinch load exerted by the pinch roller on the unspooled portion of the substrate.

6 Claims, 7 Drawing Sheets

100

(56) References Cited

U.S. PATENT DOCUMENTS

| | | | |
|---|---|---|---|
| 2013/0100194 A1 | 4/2013 | Biglari et al. | |
| 2013/0135415 A1* | 5/2013 | Claramunt | B41J 11/001 347/104 |
| 2014/0204163 A1 | 7/2014 | Ortiz et al. | |
| 2018/0111397 A1* | 4/2018 | Hirabayashi | B41J 15/04 |
| 2018/0265316 A1 | 9/2018 | Bhide et al. | |
| 2018/0273325 A1 | 9/2018 | Bhide et al. | |
| 2019/0135474 A1 | 5/2019 | Gisler et al. | |

* cited by examiner

100

1B00

200

400

300

500

600

700

SUBSTRATE ALIGNMENT

BACKGROUND

Large format printers operate by feeding a substrate directly from a roll of substrate. The substrate is loaded into or onto a printer in a properly aligned manner to achieve accurate substrate control and an acceptable image quality and alignment during a print run. In some printers, such as, for example, low-volume printers, the process of loading the substrate and addressing any skew can be automated up to a certain level of substrate skew.

A current automatic de-skew process or automatic alignment process comprises at least two long loading advances of the substrate of up to a metre per advance. Pinch wheels apply a normal force to the substrate to ensure a good advance without slippage. The pinch wheels are raised at the end of each advance and the substrate is rewound to avoid or reduce waste.

The foregoing process converges slowly to an aligned position with associated long loading advances are used. Such slow convergence is time-consuming. Furthermore, wrinkles in the substrate can be created even at low levels of initial skew. Consequently, the pinch wheels are raised or otherwise decoupled from the substrate between loading advances to release the substrate to allow the wrinkles to be removed after each advance.

BRIEF DESCRIPTION OF THE DRAWINGS

Example implementations will be described, by way of example, with reference to the accompanying drawings in which.

DETAILED DESCRIPTION

Figure 1:
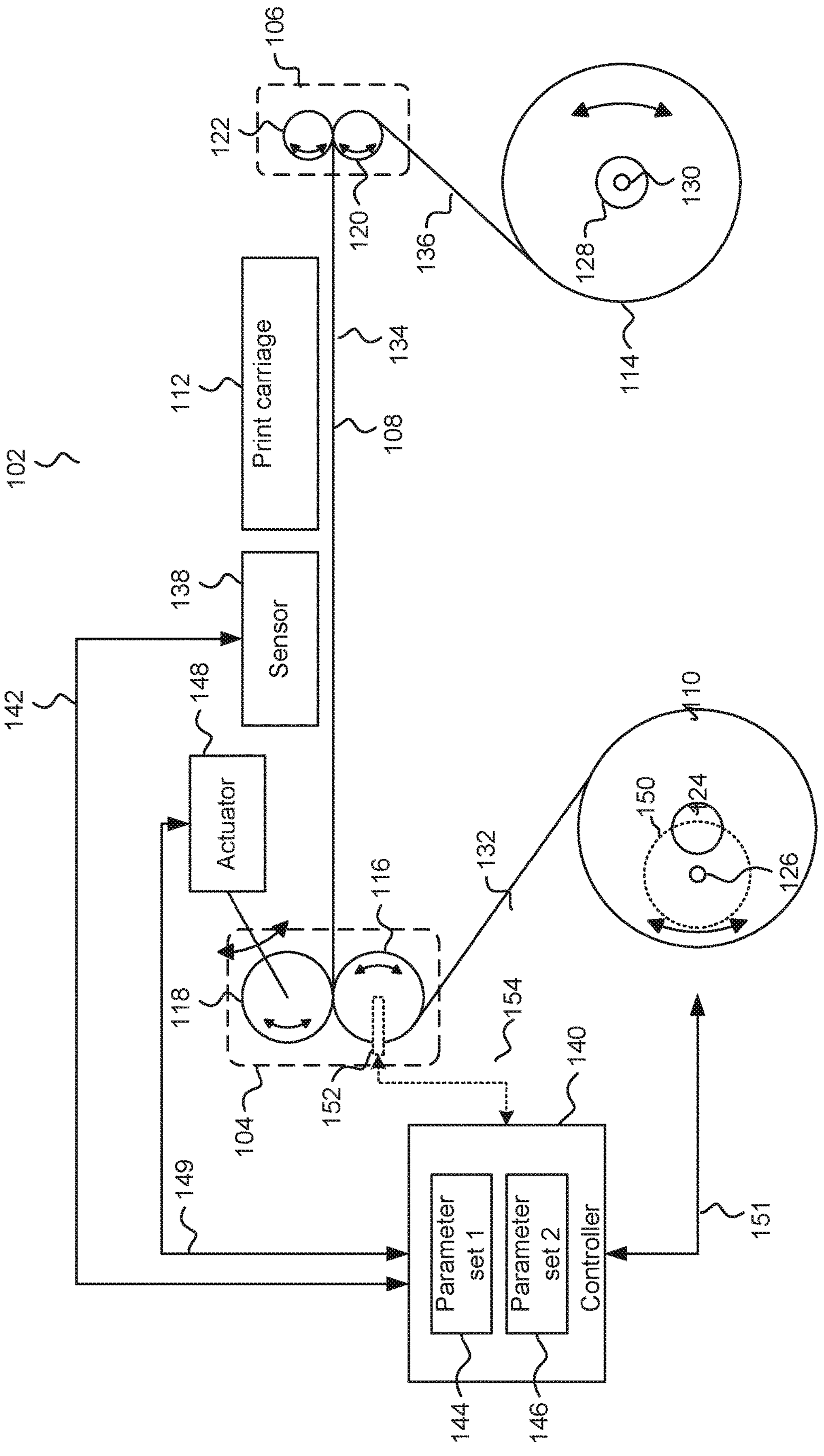
FIG. 1 shows a view of a printer according to example implementations.

Referring to FIG. 1, there is shown a view 100 of a printer 102 comprising a substrate advance mechanism. The substrate advance mechanism comprises at least one, or both, of an input driving assembly 104 or an output driving assembly 106 that are arranged to convey a substrate 108 through the printer 102. The substrate 108 is initially stored on a carrier 110. The carrier 110 can comprise a roll of the substrate 108. After printing on the substrate 108, via a print carriage 112, the substrate 108 can be spooled onto a further carrier 114. The carrier 110 is an example of an input carrier or input roll. The further carrier 114 is an example of an output carrier or output roll.

The input driving assembly 104 comprises a drive roller 116 and at least one pinch roller 118. Example implementations will be described with reference to a single pinch roller 118. However, example implementations can be realised in which a number of pinch rollers are used. The output driving assembly 106 comprises at least one rubber roller 120 that cooperates with a wheel 122 in spooling the substrate 108 onto the further carrier 114.

The print carriage 112 can be realised using a page wide array of print nozzles (not shown). Alternatively, the print carriage 112 can be reciprocally movable across the width of the substrate 108.

The carrier 110, bearing the spooled substrate 108, is loaded onto an input drive spindle 124. The input drive spindle 124 is arranged to be rotated about an input drive spindle axis 126 in a forward, or anticlockwise, direction or a reverse, or clockwise, direction. Example implementations can be realised in which the input drive spindle can selectively rotate the carrier 110 in a reciprocally rotatable manner.

The further carrier 114, bearing the spooled printed substrate 108, is loaded onto an output drive spindle 128. The output drive spindle 128 is arranged to be rotated about an output drive spindle axis 130 in a forward, or anticlockwise, direction or a reverse, or clockwise, direction.

The substrate 108 comprises various portions during its transit through the printer 102. The substrate 108 comprises an unspooled portion 132, a print portion 134 and a pre-spool portion 136. The unspooled portion 132 of the substrate 108 spans the carrier 110 and the input driving assembly 104. The print portion 134 spans the input driving assembly 104 and the output driving assembly 106. The pre-spool portion 136 spans the output driving assembly 106 and the further carrier 114. The unspooled portion 132 of the substrate 108 is an example implementation of a dispensed portion of the substrate. The tension in the unspooled portion 132 of the substrate can be increased, or varied, by resisting the forward or advance motion of the substrate 108, that is, urging or biasing the substrate against movement in the forward or advance direction.

The printer 102 comprises a sensor 138. The sensor 138 is arranged to measure the skew, or alignment, of the substrate 108 within the printer 102.

The printer 102 is operable under the control of a controller 140. The controller 140 is responsive to at least one feedback signal or to a number of feedback signals. The at least one feedback signal, or the number of feedback signals, can comprise a skew feedback signal 142 output by the sensor 138 to provide an indication to the controller 140 of the degree of skew associated with the substrate 108.

The controller 140 is arranged to control initial loading and aligning of the substrate 108 in the printer 102 and subsequent printing, via the print carriage 112, on the substrate 108. Therefore, the controller 140 controls a loading and aligning, or de-skewing, phase of the substrate 108 and controls a printing phase for the substrate 108.

Incorrect or improper alignment of the substrate 108 during initial loading can cause substrate anomalies. The substrate anomalies can comprise wrinkles, or other distortions, of the unspooled portion 132 of the substrate 108. The wrinkles or distortions can damage or otherwise adversely affect the substrate 108, which, in turn, creates or introduces image quality issues when printing on the damaged or adversely affected substrate 108.

The controller 140 comprises an initial set of parameters 144 to be used in configuring or controlling the printer 102 during the loading and aligning phase. The controller 140 also comprises a further set of parameters 146 to be used in configuring or controlling the printer 102 during the printing phase. The initial set of parameters 144 has different values to the values of the further set of parameters 146.

Example implementations can be realised in which the initial set of parameters 144 and the further set of parameters 146 are arranged to induce respective predetermined tensions in the unspooled portion 132 of the substrate 108. The respective predetermined tensions can comprise an alignment tension and a printing tension. The alignment tension is a tension applied to the unspooled portion 132 of the substrate 108 during initial loading and aligning of the substrate 108 into the printer 102. The printing tension is a tension applied to the unspooled portion 132 of the substrate 108 during printing onto the substrate 108. The alignment tension is greater than the printing tension. Example implementations can be realised in which the alignment tension is 25 Nm or greater. Example implementations can be realised in which the printing tension is 10 to 15 Nm or less. Example implementations can be realised in which the alignment tension is 25 Nm or greater and the printing tension is 10 to 15 Nm or less.

Loading the substrate 108 under the alignment tension results in the wrinkles or other distortions of the unspooled portion 132 of the substrate 108 being at least reduced, or eliminated. The alignment tension at which wrinkles or other distortions are reduced or eliminated adversely affects image quality due to being too high during printing. Therefore, once the substrate 108 has been loaded and aligned with an acceptable level of skew or without any skew, the printing tension is applied or induced in the unspooled portion 132 of the substrate 108 at least prior to printing, during printing or both.

The printer 102 comprises an actuator 148. The actuator 148 is arranged to control the frictional coupling between the pinch roller 118 and the substrate 108. The frictional coupling between the pinch roller 118 and the substrate 108 is controlled by varying the pinch roller force or load exerted by the pinch roller 118 onto the substrate 108. The actuator 148 is responsive to an actuator control signal 149 output by the controller 140 to vary the pinch roller force or load applied to the substrate 108.

The input drive spindle 124 has an associated encoder 150. The encoder 150 is used to determine at least one, or both, of direction of movement of the substrate 108 or speed of movement of the substrate 108 in a given direction. The output 151 of the encoder 150 is used by the controller 140 to determine, in particular, whether or not the substrate 108 is advancing in the advance or forward direction through the printer 102 during an advance movement even though the unspooled portion 132 of the substrate 108 is under tension. If the tension is too high, that is, if the tension in the unspooled portion 132 of the substrate 108 causes the unspooled portion 132 of the substrate to move in the reverse direction, or to have a speed of movement of 0 m/s, then the tension is reduced to allow movement in the advance direction when intended. Such an advance or forward direction movement is an example implementation of a forward motion.

Figure 1B:
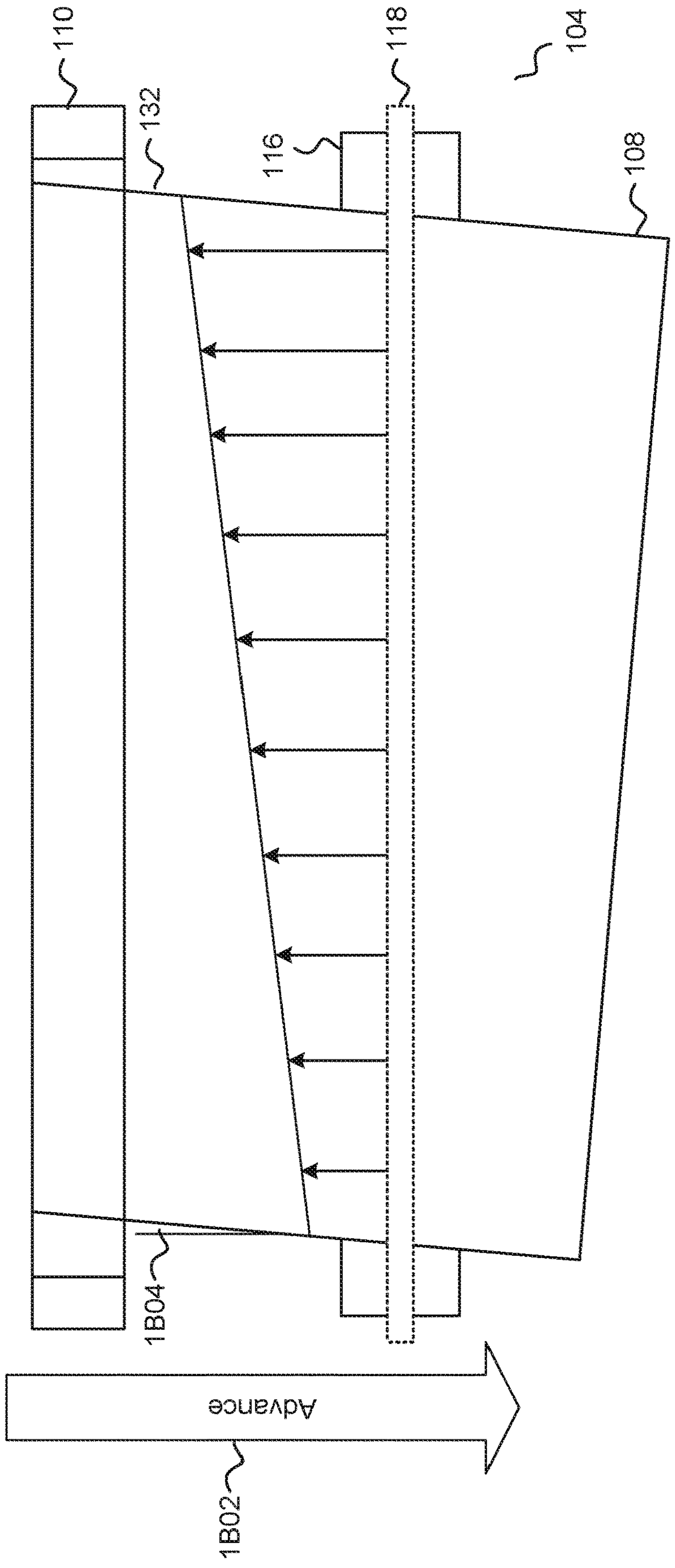
FIG. 1B shows alignment tension distribution according to example implementations.

Referring to FIG. 1B, there is shown a view 1B00 of a variation in tension in the unspooled portion 132 of the substrate 108 while advancing in the forward or advance direction 1B02. The unspooled portion 132 of the substrate 108 spans the carrier 110 and the input driving assembly 104 comprising the drive roller 116 and the pinch roller 118. The tension progressively increases in the unspooled portion 132 of the substrate 108 moving across the substrate from left to right due to the misalignment or skew 1B04 of the substrate 108.

Figure 2:
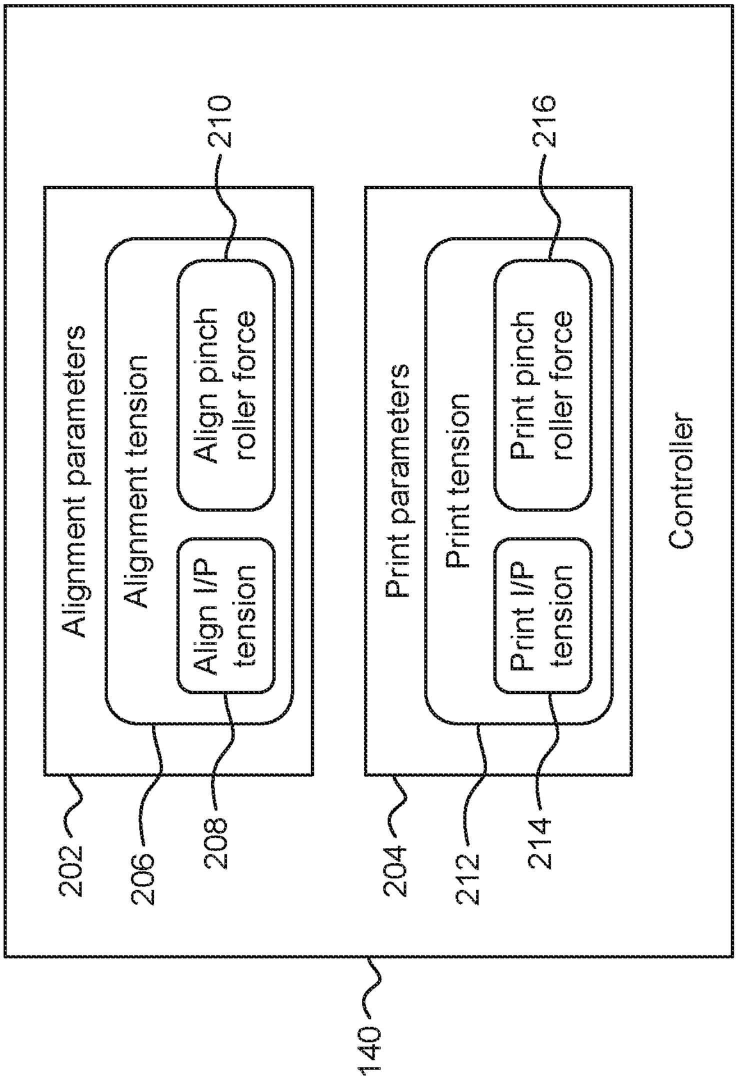
FIG. 2 illustrates printer parameters according to example implementations.

Referring to FIG. 2, there is shown a view 200 of example implementations in which the controller 140 comprises, or has access to, a set of alignment parameters 202 and print parameters 204. The set of alignment parameters 202 is an example implementation of the initial set of parameters 144. The set of print parameters 204 is an example implementation of the further set of parameters 146. The set of alignment parameters 202 is applied or used in aligning the substrate 108. The set of print parameters 204 is applied or used in printing on the substrate 108.

The set of alignment parameters 202 comprises a prescribed alignment tension 206. The prescribed alignment tension 206 sets, or influences, the tension in the unspooled portion 132 of the substrate 108. The prescribed alignment tension 206 can comprise or be derived from at least one parameter or from a number of parameters. The prescribed alignment tension 206 can be realised by varying at least one, or both, of the input drive spindle speed and/or direction of rotation of the input drive spindle 124 or the pinch roller force or load applied by the pinch roller 118 to the substrate 108. Therefore, example implementations of the alignment tension 206 comprise at least one, or both, of an alignment input tension 208 or an alignment pinch roller force 210. The alignment input tension 208 influences, or can prescribe, the input tension induced in the unspooled portion 132 of the substrate 108 that follows from operating the input drive spindle 124. The alignment pinch roller force 210 influences, or can prescribe, a tension induced in the unspooled portion 132 of the substrate 108 that follows from controlling the pinch roller force on the substrate 108. Example implementations can be realised in which the alignment input tension 208 and the alignment pinch roller force 210 influence, or can prescribe, the input tension induced in the unspooled portion 132 of the substrate 108.

The set of print parameters 204 comprises a prescribed print tension 212. The prescribed print tension 212 sets, or influences, the tension in the unspooled portion 132 of the substrate 108. The prescribed print tension 212 can comprise or be derived from at least one parameter or from a number of parameters. The prescribed print tension 212 can be realised by varying at least one, or both, of the input drive spindle speed and/or direction of rotation of the input drive spindle 124 or the pinch roller force or load applied by the pinch roller 118 to the substrate 108. Therefore, example implementations of the print tension 212 comprise at least one, or both, of a print input tension 214 or a print pinch roller force 216. The print input tension 214 influences, or can prescribe, the input tension induced in the unspooled portion 132 of the substrate 108 that follows from operating the input drive spindle 124. The print pinch roller force 216 influences, or can prescribe, a tension induced in the unspooled portion 132 of the substrate 108 that follows from controlling the pinch roller force on the substrate 108. Example implementations can be realised in which the print input tension 214 and the print pinch roller force 216 influence, or can prescribe, the input tension induced in the unspooled portion 132 of the substrate 108.

The pinch roller force or load exerted on the substrate 108 by the pinch roller 118 is controlled by the actuator 148. The actuator 148 is arranged, in response to the initial 144 or further 146 sets of parameters, to increase or decrease the pinch roller force applied to the substrate 108 by the pinch roller 118.

The pinch roller force on the substrate is arranged, during the loading and aligning phase, to be reduced compared to the pinch roller force during the printing phase. The pinch roller force affects the frictional coupling between the pinch roller 118 and the substrate 108.

Example implementations are arranged such that the frictional coupling between the pinch roller 118 and the substrate 108 allows slippage between the pinch roller 118 and the substrate 108. The slippage influences the alignment of the substrate. Therefore, varying or otherwise controlling or setting the tension in the unspooled portion 132 of the substrate 108 varies or otherwise controls or sets the alignment of the substrate 108.

The frictional coupling between the pinch roller 118 and the substrate 108 can vary according to substrate type. Therefore, example implementations can be realised in which the controller comprises a number of sets of alignment parameters and/or a number of sets of print parameters in which each set is prescribed for use with a respective substrate or a respective set of substrates of the same type.

Figure 3:
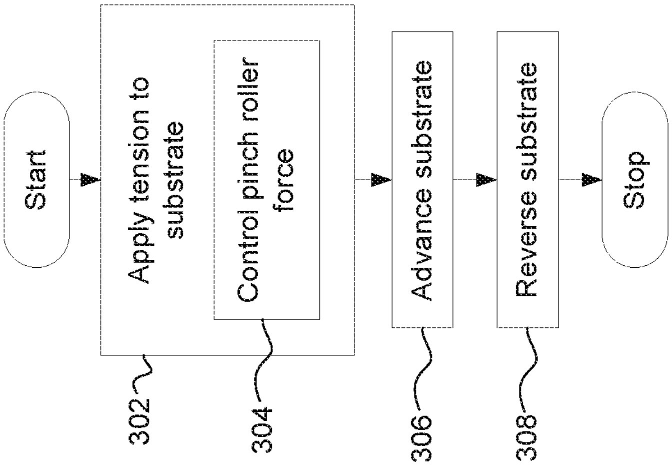
FIG. 3 illustrates a flowchart for substrate loading and alignment according to example implementations.

Referring to FIG. 3, there is shown a view 300 of a flowchart for loading and aligning the substrate 108 according to example implementations. Having coupled the substrate 108 to the printer 102, an alignment tension is applied to the unspooled portion 132 of the substrate at 302.

Applying a tension to the substrate 108, at 302, comprises controlling, at 304, at least the pinch roller force, according to the alignment pinch roller force or parameter 210, applied to the substrate 108 via the pinch roller 118. The substrate 108 is moved under the applied tension and, in particular, under the pinch roller force. The pinch roller force applied to the substrate 108 is such that there is slippage between the pinch roller 118, the drive roller 116 and the substrate 108.

Allowing such slippage while attempting to advance the substrate 108, at 306, has the effect of reducing the misalignment or skew of the substrate 108. At 308, the substrate 108 is rewound onto the carrier 110. At this point, the skew of the substrate 108 will have been reduced.

Advancing the substrate 108, at 306, under the applied alignment input tension 208, in conjunction with the alignment pinch roller force, while advancing the substrate 108, or urging the substrate 108 in the forward or advance direction, improves the alignment of the substrate 108. The foregoing can be repeated until the skew has been eliminated or has at least been reduced to a value that is less than or equal to a predetermined skew threshold.

Figure 4:
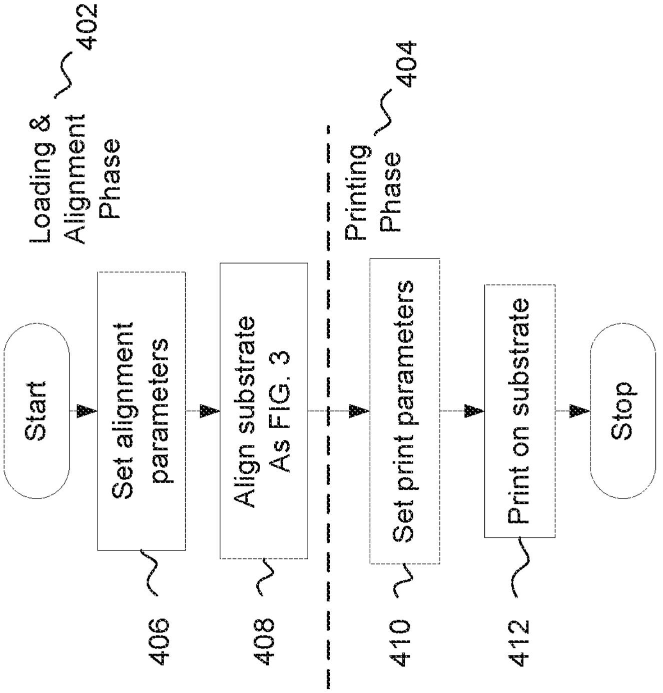
FIG. 4 depicts a flowchart for substrate loading and alignment according to example implementations.

Referring to FIG. 4, there is shown a view 400 of a flowchart for loading, aligning and printing on the substrate 108. The loading, aligning and printing process comprises two distinct phases; namely, a loading and aligning phase 402 and a printing phase 404. The loading and aligning phase 402 loads and aligns the substrate 108. The printing phase 404 prints on the substrate 108.

The alignment parameters 202 relevant to the substrate 108 are loaded, or otherwise accessed, by the controller 140 at 406. The alignment process described above with reference to the flowchart of FIG. 3 is implemented, at 408, under the influence of the alignment parameters 202, to achieve an alignment that has no skew or that has skew that is less than or equal to the predetermined skew threshold.

Once the substrate 108 has been properly loaded and aligned, the printing phase 404 can commence. At 410, the print parameters 204 relevant to the substrate 108 are loaded, or otherwise accessed, by the controller 140, to configure the operation of the printer 102. At 412, the printer 102 is arranged to print on the substrate 108 under the influence of the print parameters 204.

Figure 5:
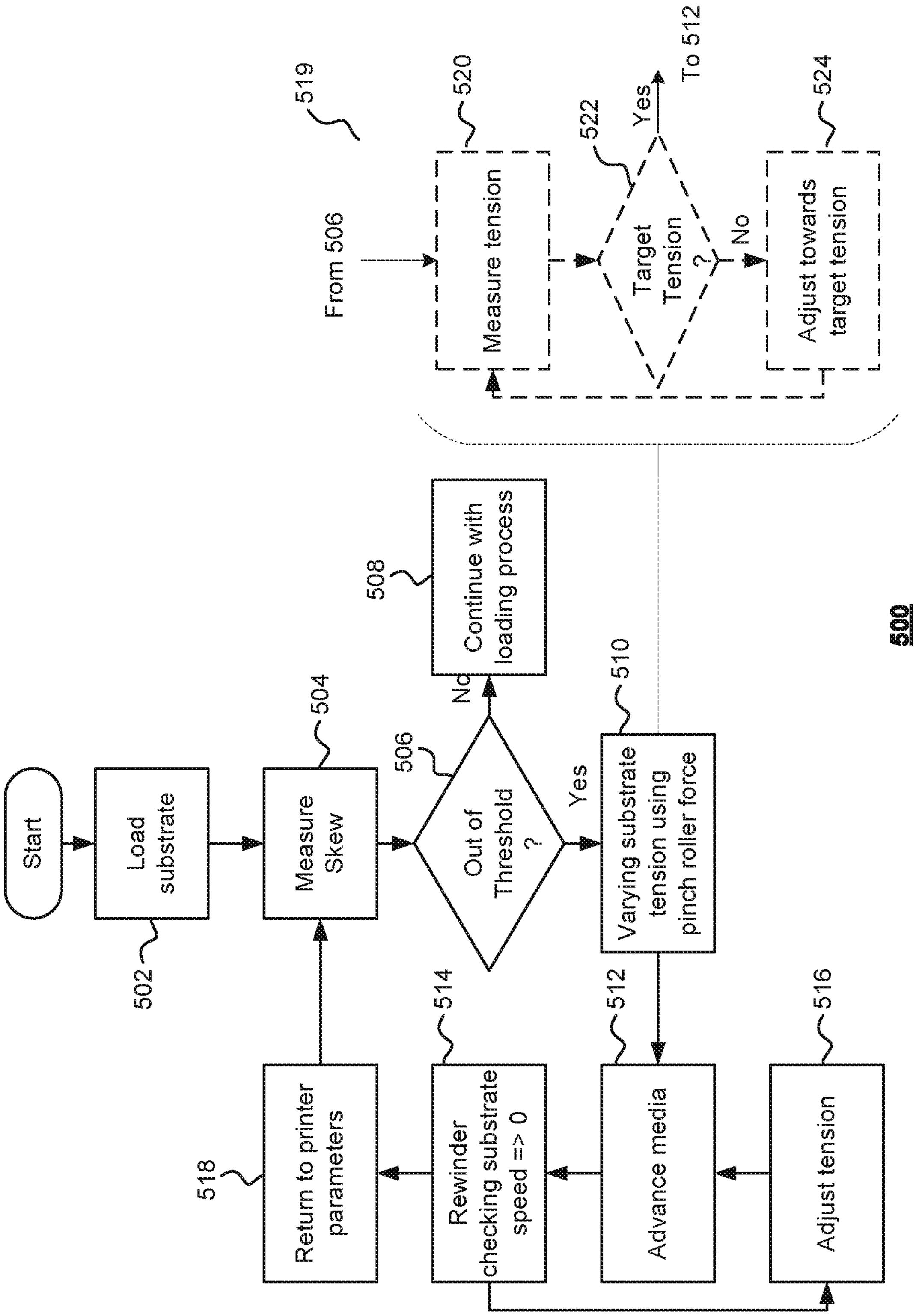
FIG. 5 shows a flowchart for substrate loading and alignment according to example implementations.

Referring to FIG. 5, there is shown a view 500 of a flowchart for controlling loading and aligning of the substrate 108 according to example implementations. At 502, the substrate is loaded into the printer 102, that is, it is coupled to at least one, or both, of the input driving assembly 104 and the output driving assembly 106; it can further be coupled to the further carrier 114. The degree of skew 1B04 associated with the substrate 108 is determined, at 504, by the sensor 138. It is determined, at 506, whether or not the degree of skew meets a predetermined criterion. The predetermined criterion can be whether or not the degree of skew is less than or equal to the predetermined skew threshold.

If the determination, at 506, is such that the degree of skew meets the predetermined criterion, the substrate 108 is deemed to be sufficiently well aligned to continue with the loading process or to move on to the printing phase, at 508. For example, example implementations can be realised, at 508, in which, after alignment of the substrate, one or more other further loading operations are performed. Such additional loading operations can comprise localizing substrate edges, measuring substrate width or calibrating an advance sensor (not shown) with the loaded substrate taken jointly and severally in any and all permutations. If the determination, at 506, is such that the predetermined criterion has not been met, the tension in the unspooled portion 132 of the substrate 108 is varied or set. As indicated above, the tension in the unspooled portion 132 of the substrate 108 is varied or set, at 510, by controlling at least one, or both, of the alignment pinch roller parameter 210 or the alignment input tension 208. Example implementations can be realised that increase the tension in the unspooled portion 132 of the substrate 108 during loading and aligning. The tension in the unspooled portion 132 of the substrate 108 during loading and aligning can be increased relative to the tension in the unspooled portion 132 of the substrate during printing.

At 512, the substrate 108 is advanced by at least one, or both, of the input driving assembly 104 or the output driving assembly 106. Example implementations can be realised in which the substrate 108 is advanced by a predetermined amount. The predetermined amount can be, for example, 1 m. Although the predetermined amount has been indicated as being 1 m, example implementations are not limited to such an arrangement. Example implementations can be realised that advance the substrate 108 by a different amount other than 1 m.

At 514, a determination is made regarding the speed or direction of travel of the substrate 108. If the direction of travel of the substrate 108 is not in the advance direction, or the speed of the substrate 108 is not greater than or equal to 0 m/s, the tension in the unspooled portion 132 of the substrate 108 is varied, at 516, until the direction of travel is in the advance direction, or the speed of the substrate 108 is greater than 0 m/s. Varying the tension in the unspooled portion 132 of the substrate 108 to ensure that the direction of travel is in the advance direction, or to ensure that the speed of the substrate is greater than 0 m/s, can be realised by at least one, or both, of reducing the alignment input tension 208 or increasing the alignment pinch roller force 210. Furthermore, any such a reverse motion of the substrate can be controlled, reduced or eliminated by the controller 140 to at least reduce, or prevent, the substrate 108 unwinding from the carrier 110 bearing the substrate 108.

If the determination at 514 is that the direction of travel of the substrate 108 is in the advance direction, or that the speed of the substrate 108 is greater than 0 m/s, processing continues, at 518, to set parameters 204 for printing. The parameters 204 for printing can comprise at least one, or both, of the above-described printing input tension 214 or printing pinch roller force 216.

Figure 6:
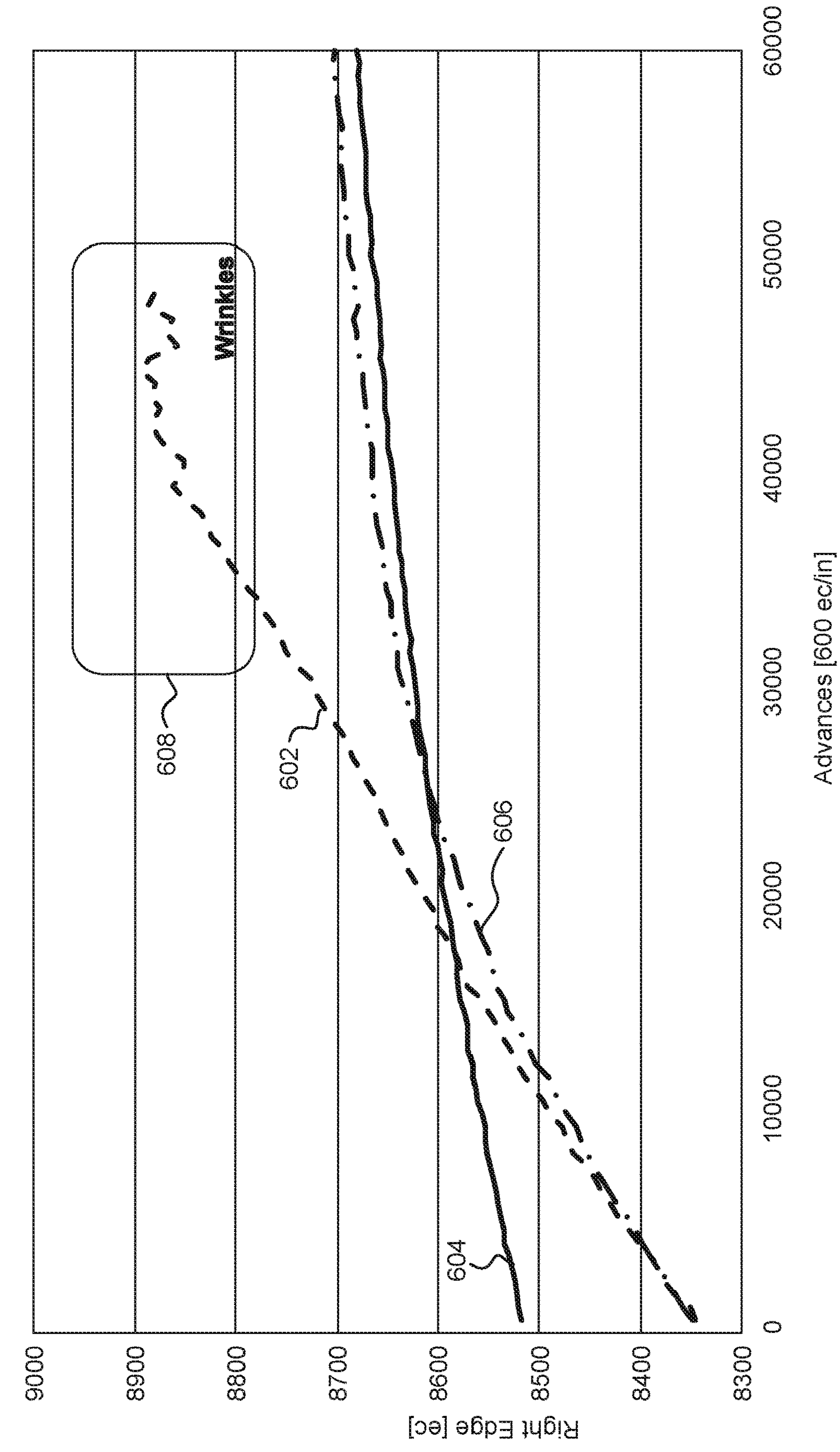
FIG. 6 depicts performance data comparisons according to example implementations.

Referring to FIG. 6, there is shown a view 600 of a graph demonstrating the performance of example implementations. The graph comprises three performance lines 602, 604 and 606. The dashed performance line 602 represents the variation in skew, or the position of the right-hand edge of the substrate 108, under an initial relatively large skew and a corresponding or relatively low alignment input tension. The low alignment input tension can be a tension that is substantially the same as the printing input tension 214. It can be appreciated that the gradient of the dashed performance line 602 is relatively steep and the misalignment increases relatively quickly to the point that the misalignment induces wrinkles or other distortions 608 in the substrate 108 at, or beyond, a predetermined degree of skew or misalignment.

The solid performance line 604 represents a variation in skew or the position of the right-hand edge of the substrate 108 under an initially low skew and a corresponding or relatively low alignment input tension. The corresponding low alignment input tension can be a tension that is substantially the same as the printing input tension 214. It can be appreciated that the gradient of the solid line 604 is relatively shallow compared to the gradient of the dashed line 602 with the consequence that alignment convergences to a point where the degree of skew is less than or equal to the predetermined skew threshold relatively slowly.

The remaining performance line 606, shown in a dot dash format, represents a variation in skew or the position of the right-hand edge of the substrate 108 under an initially large skew and a corresponding or relatively high alignment input tension according to example implementations. The corresponding high alignment input tension can be a tension that is greater than the printing input tension 214. It can be appreciated that the performance line 606 shows a progressive but more rapid convergence of alignment to a point where the degree of skew is less than or equal to the predetermined skew threshold within a relatively short period of time.

Alternatively, or additionally, example implementations can be realised in which a closed-loop control system is used to load the substrate 108 to at least reduce, or avoid, misalignment or skew anomalies as opposed to the above described open-loop control system. Therefore, misalignment or skew anomalies of the substrate 108 should be reduced or avoided. The printer 102 uses the sensor 138 to provide a skew feedback signal 142 to the controller 140.

Therefore, returning to FIG. 5, there is shown a section 519 of the flowchart showing in a dashed-line format. The additional section 519 can be an example implementation of 510. The additional section 519 of the flowchart implements a closed-loop control system in which the tension in the unspooled portion 132 of the substrate 108 is measured and controlled to be a predetermined tension, or controlled to be within a predetermined tension range, corresponding to the substrate 108. Therefore, varying the substrate tension using the pinch roller force at 510 can, in a closed-loop control system implemented by the controller 140, comprise measuring the tension, at 520, in the unspooled portion 132 of the substrate 108, determining, at 522, whether or not the tension in the unspooled portion 132 of the substrate 108 corresponds to a target tension, and, at 524, adjusting the tension in the unspooled portion 132 of the substrate 180 towards the target tension. The target tension is an example implementation of the above described alignment tension 206 or, in particular, the above described alignment input tension 208.

Referring to FIG. 1, the example implementation of the printer 102 can be supplemented with at least one strain gauge for measuring the tension in the unspooled portion 132 of the substrate 108, at 520, in FIG. 5. The drive roller 116 is shown as having a corresponding strain gauge 152. The strain gauge 152 provides a drive roller feedback signal 154 to the controller 140. The drive roller feedback signal 154 is a signal indicating, or influenced by or otherwise associated with, the strain experienced by the strain gauge. The controller 140 uses the driver roller feedback signal 154 to determine the tension in the unspooled portion 132 of the substrate 108. A strain gauge can also be fitted to any of the pinch roller 118, the input drive spindle 124 or both. One or more such strain gauges can also provide respective feedback signals to the controller 140 from which the controller can calculate or otherwise determine the tension in the unspooled portion 132 of the substrate 108. The controller 140, having determined the tension in the unspooled portion 132 of the substrate 108 can take action to control the tension in the unspooled portion 132 of the substrate 108. The controller 140 can vary the tension in the unspooled portion 132 of the substrate 108 by varying at least one, or both, of the pinch roller force or the alignment input tension.

Example implementations can provide machine-readable storage storing instructions such as, for example, machine-executable instructions. The machine-readable storage can comprise transitory or non-transitory machine-readable storage. The machine can comprise one or more real or virtual processors, or other circuitry, for executing the instructions, implementing the instructions, interpreting the instructions or otherwise processing and giving effect to the instructions.

It will be appreciated that circuitry as used herein can comprise any of physical electronic circuitry, software (such as the above instructions), hardware, application specific integrated circuitry, or the like, taken jointly or severally in any and all permutations.

Figure 7:
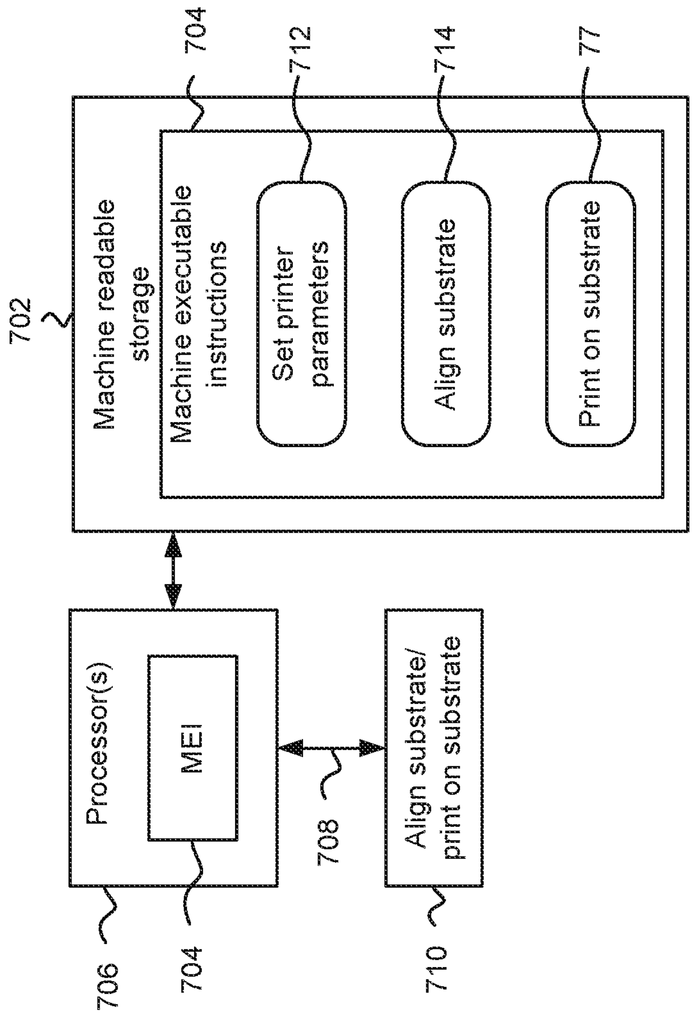
FIG. 7 shows machine-readable storage and machine-executable instructions according to example implementations.

Accordingly, referring to FIG. 7, there is shown a view 700 of implementations of at least one of the above instructions or machine-readable storage. FIG. 7 shows machine-readable storage 702. The machine-readable storage 702 can be realised using any type of volatile or non-volatile storage such as, for example, memory, a ROM, RAM, EEPROM, or other electrical storage, or magnetic or optical storage or the like. The machine-readable storage 702 can be transitory or non-transitory. The machine-readable storage 702 stores the above instructions such as, for example, machine-executable instructions (MEIs) 704. The MEIs 704 comprise instructions that are executable by a processor or other instruction execution, instruction implementation, instruction interpretation or instruction processing circuitry 706. The processor or other circuitry 706 is responsive to executing or implementing the MEIs 704 to perform any and all activities, operations, or methods described and/or claimed in this application such as the operations described with reference to at least one or more of FIGS. 1 to 6 taken jointly and severally in any and all permutations.

The processor or other circuitry 706 can output or receive one or more than one control or feedback signal 708 for controlling other devices 710 or from such other devices 710. Example implementations of such other devices 710 comprise, for example, at least one or more of the input assembly 104, the output assembly 106, the drive roller 116, the pinch roller 118, the rubber roller 120, the wheel 122, the input drive spindle 124, the output drive spindle 128, the print carriage, the sensor 138, or the actuator 148 taken jointly and severally in any and all permutations.

The MEIs 704 can comprise MEIs to implement any flowchart described herein or any part thereof taken jointly and severally with any other part thereof, and/or any method described herein.

Example implementations can be realised according to any of the following clauses:

Clause 1. Machine readable storage storing instructions arranged, when executed, to reduce substrate skew in a substrate advance mechanism, the instructions comprising: instructions to apply an alignment tension to a dispensed portion of the substrate that urges against a forward motion of the substrate through the advance mechanism, the instructions to apply the alignment tension comprising instructions to apply a predetermined pinch roller force to the substrate during the forward motion; said predetermined pinch roller force being less than a printing pinch roller force applied during a subsequent operation such as, for example, printing, and instructions to control moving the substrate through the advance mechanism under the alignment tension and pinch roller force.

Clause 2. The machine readable storage of clause 1 comprising instructions to apply a printing tension to the substrate while advancing the substrate through the advance mechanism; the printing tension being lower than the alignment tension.

Clause 3. The machine readable storage of any preceding clause comprising instruction to apply the printing pinch roller force to the substrate while advancing the substrate through the advance mechanism; the printing pinch roller force being greater than the predetermined pinch roller force.

Clause 4. The machine readable storage of any preceding clause comprising instructions to select at least one, or both, of the alignment tension and predetermined pinch roller force from a number of predetermined sets of parameters comprising alignment tensions and predetermined pinch roller forces.

Clause 5. The machine readable storage of clause 4 in which the number of predetermined sets of parameters comprising alignment tensions and predetermined pinch rollers forces are associated with different, respective, substrate types.

Clause 6. The machine readable storage of any preceding clause comprising instructions to control a reverse motion of the substrate to at least reduce, or prevent, the substrate unwinding from a respective carrier bearing the substrate.

Clause 7. The machine readable storage of clause 6 comprising instructions to measure at least one, or both, of the speed or direction of motion of the substrate using an encoder associated with the respective carrier bearing the substrate.

Clause 8. Machine readable storage storing instructions arranged, when implemented, to control aligning of, or printing on, a substrate or to control wrinkles on the substrate; the machine readable storage comprising: instructions to set the alignment for the substrate using a set of substrate alignment parameters comprising an alignment input tension and an alignment pinch roller force, instructions to move the substrate under the influence of the alignment input tension and the alignment pinch roller force, and instructions to print on the substrate using a set of substrate printing parameters comprising a printing input tension and a printing pinch roller force, wherein at least one, or both, of the alignment input tension is different to the printing input tension or the alignment pinch roller force is different to the printing pinch roller force. Example implementations can be realised according to clause 8 in which the alignment input tension and alignment pinch roller force induce a greater tension in the unspooled portion of the substrate as compared to the tension in the unspooled portion of the substrate induced by the printing input tension and the printing pinch roller force.

Clause 9. The machine readable storage of clause 8 in which the alignment input tension is between 20-30 Nm, or 25 Nm.

Clause 10. The machine readable storage of clause 9 in which the printing input tension is between 10-15 Nm.

Clause 11. A controller comprising circuitry to align a substrate; the controller comprising: circuitry to control varying the tension of an unspooled portion of the substrate between a spool bearing the substrate and a pinch roller; said circuitry comprising circuitry to control varying the pinch load exerted by the pinch roller on the unspooled portion of the substrate.

Clause 12. An apparatus to reduce skew of a substrate in a substrate advance assembly, the apparatus comprising: a control mechanism to vary an alignment tension of a dispensed portion of the substrate; said substrate being biased against a forward motion of the substrate through the advance assembly, the control mechanism to apply the alignment tension comprising: an actuator to vary a pinch roller load, exerted by a pinch roller, on the dispensed portion of the substrate during movement of the substrate; and a drive mechanism to move the substrate through the advance mechanism under the alignment tension.

Clause 13. A printer to print on a substrate, the printer comprising an alignment mechanism to reduce skew of the substrate, the alignment mechanism comprising:

a tensioning mechanism to adjust a frictional coupling between an unspooled portion of the substrate and at least one pinch roller, the tensioning mechanism comprising at least one actuator for varying the frictional coupling between the at least one pinch roller and the unspooled portion of the substrate.

Clause 14. The printer of clause 13, in which the tensioning mechanism comprises a carrier drive arranged to resist forward movement of the substrate.

Clause 15. The printer of clause 14, in which the at least one actuator for varying the frictional coupling between the at least one pinch roller and the unspooled portion of the substrate is arranged to apply an alignment load during loading the substrate into the printer and to apply a print load during printing on the substrate.

The invention claimed is:

1. A controller comprising circuitry to align a substrate; the controller comprising:

circuitry to control varying a tension of a section of an unspooled portion of the substrate between a spool bearing the substrate and a pinch roller;

said circuitry comprising circuitry to control varying a pinch load exerted by the pinch roller on the section of the unspooled portion of the substrate, wherein the tension on the section of the unspooled portion of the substrate comprises a first tension during alignment of the substrate prior to printing on the substrate and a second tension during printing on the substrate, where the first tension is different from the second tension, wherein the first tension is greater than the second tension.

2. A printer to print on a substrate, the printer comprising an alignment mechanism to reduce skew of the substrate, the alignment mechanism comprising:

a tensioning mechanism to adjust a frictional coupling between a section of an unspooled portion of the substrate and at least one pinch roller, the tensioning mechanism comprising at least one actuator for varying the frictional coupling between the at least one pinch roller and the section of the unspooled portion of the substrate, wherein the frictional coupling between the section of the unspooled portion of the substrate and the at least one pinch roller comprises a first frictional coupling during alignment of the substrate prior to printing on the substrate and a second frictional coupling during printing on the substrate, where the first frictional coupling is different from the second frictional coupling.

3. The printer of claim 2 in which the tensioning mechanism comprises a carrier drive arranged to resist forward movement of the substrate.

4. The printer of claim 3 in which the at least one actuator for varying the frictional coupling between the at least one pinch roller and the section of the unspooled portion of the substrate is arranged to apply an alignment load during loading the substrate into the printer and to apply a print load during printing on the substrate.

5. The printer of claim 2, wherein the first frictional coupling is greater than the second frictional coupling.

6. An apparatus to reduce skew of a substrate in a substrate advance assembly, the apparatus comprising:

a controller comprising:

circuitry to control varying a tension of a section of an unspooled portion of the substrate between a spool bearing the substrate and a pinch roller;

said circuitry comprising circuitry to control varying a pinch load exerted by the pinch roller on the section of the unspooled portion of the substrate, wherein the tension on the section of the unspooled portion of the substrate comprises a first tension during alignment of the substrate prior to printing on the substrate and a second tension during printing on the substrate, where the first tension is different from the second tension, and a control mechanism to vary an alignment tension of the section of the unspooled portion of the substrate;

said substrate being biased against a forward motion of the substrate through the substrate advance assembly, the control mechanism to apply the alignment tension comprising:

an actuator to vary the pinch roller load, exerted by the pinch roller, on the section of the unspooled portion of the substrate during movement of the substrate; and a drive mechanism to move the substrate through the substrate advance assembly under the alignment tension, wherein the first tension is greater than the second tension.

* * * * *